United States Patent
Kalman et al.

(10) Patent No.: US 11,815,712 B2
(45) Date of Patent: Nov. 14, 2023

(54) MULTI-LAYER PLANAR WAVEGUIDE INTERCONNECTS

(71) Applicants: Robert Kalman, Mountain View, CA (US); Bardia Pezeshki, Mountain View, CA (US); Alexander Tselikov, Mountain View, CA (US); Cameron Danesh, Mountain View, CA (US)

(72) Inventors: Robert Kalman, Mountain View, CA (US); Bardia Pezeshki, Mountain View, CA (US); Alexander Tselikov, Mountain View, CA (US); Cameron Danesh, Mountain View, CA (US)

(73) Assignee: AvicenaTech Corp., Mountain View, CA (US)

( * ) Notice: Subject to any disclaimer, the term of this patent is extended or adjusted under 35 U.S.C. 154(b) by 111 days.

(21) Appl. No.: 17/492,248

(22) Filed: Oct. 1, 2021

(65) Prior Publication Data

US 2022/0107456 A1    Apr. 7, 2022

Related U.S. Application Data

(60) Provisional application No. 63/086,365, filed on Oct. 1, 2020.

(51) Int. Cl.
*G02B 6/00* (2006.01)
*F21V 8/00* (2006.01)
*G02B 6/42* (2006.01)
*G02B 6/43* (2006.01)

(52) U.S. Cl.
CPC ......... *G02B 6/0076* (2013.01); *G02B 6/0073* (2013.01); *G02B 6/428* (2013.01); *G02B 6/43* (2013.01)

(58) Field of Classification Search
CPC .... G02B 6/0076; G02B 6/0073; G02B 6/428; G02B 6/43
USPC .......................................... 385/129
See application file for complete search history.

(56) References Cited

U.S. PATENT DOCUMENTS

| | | | |
|---|---|---|---|
| 2003/0081922 A1* | 5/2003 | Ide | G02B 6/132 385/129 |
| 2005/0141823 A1* | 6/2005 | Han | G02B 6/4204 385/89 |
| 2015/0333831 A1* | 11/2015 | Lai | G02B 6/428 250/208.2 |
| 2016/0172020 A1 | 6/2016 | Baker et al. | |
| 2019/0049367 A1 | 2/2019 | Zou | |
| 2019/0165209 A1 | 5/2019 | Bonar et al. | |
| 2021/0080664 A1* | 3/2021 | Pezeshki | G02B 6/4214 |

(Continued)

OTHER PUBLICATIONS

International Search Report on related PCT Application No. PCT/US2021/053210 from International Searching Authority (KIPO) dated Jan. 21, 2022.

(Continued)

*Primary Examiner* — Jerry M Blevins
(74) *Attorney, Agent, or Firm* — KOS IP Law LLP

(57) ABSTRACT

A multi-layer planar waveguide may be used in providing an interconnect for inter-chip and/or intra-chip signal transmission. Various embodiments to transmit optical signals are disclosed, along with designs of microLED optical assemblies, photodetector optical assemblies, waveguides, and multi-layer planar waveguides.

7 Claims, 15 Drawing Sheets

(56) References Cited

U.S. PATENT DOCUMENTS

2022/0244458 A1* 8/2022 Koch ................ B29D 11/0075

OTHER PUBLICATIONS

Written Opinion on related PCT Application No. PCT/US2021/053210 from International Searching Authority (KIPO) dated Jan. 21, 2022.

* cited by examiner

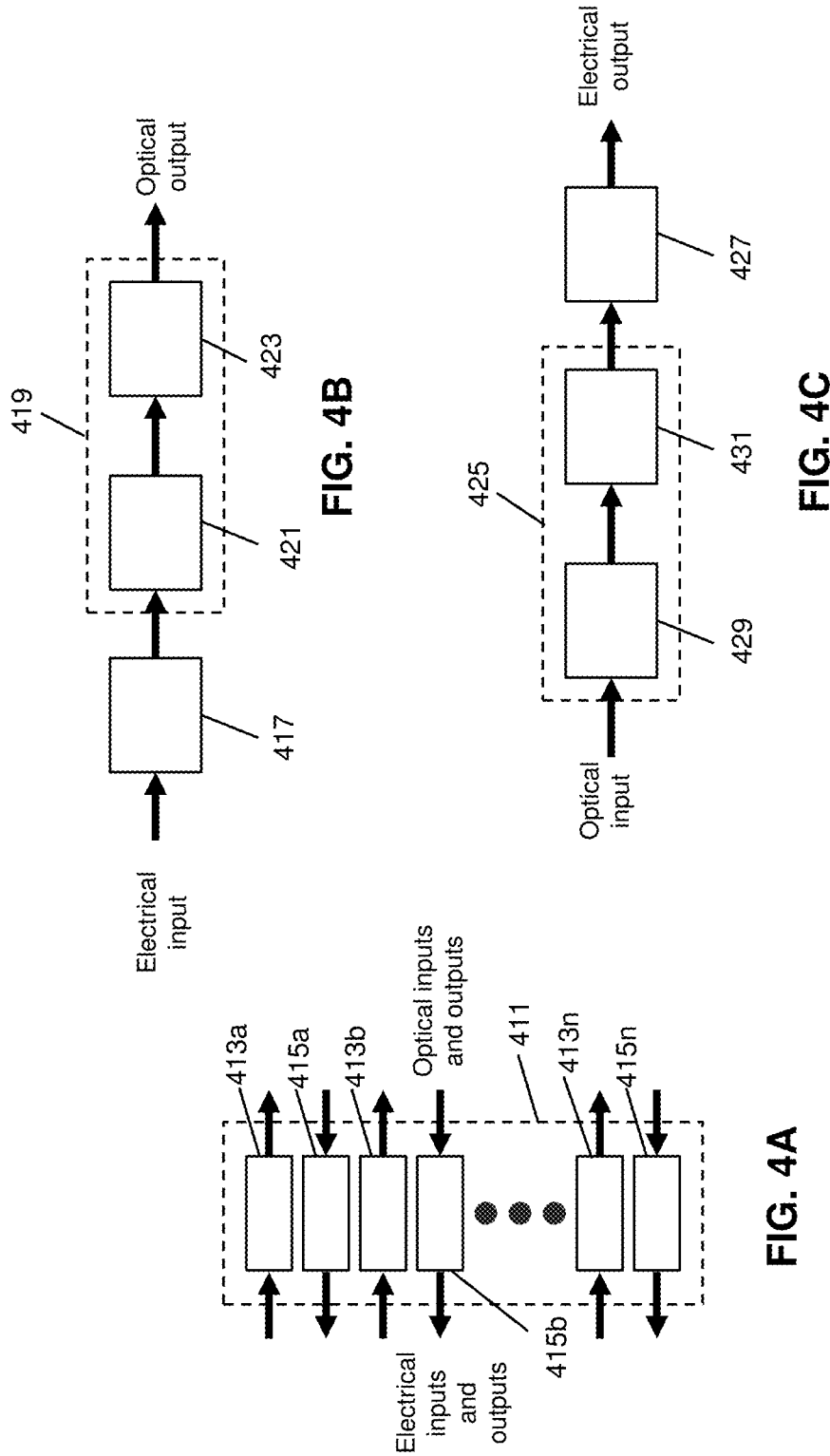

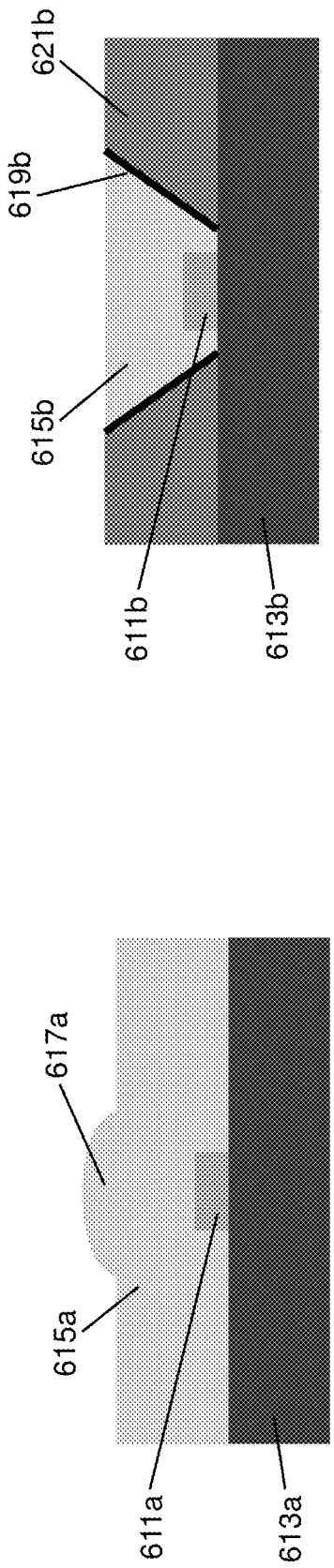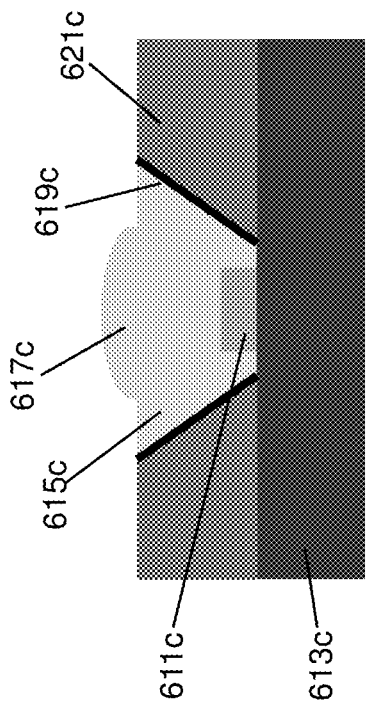
FIG. 6A
FIG. 6B
FIG. 6C ively proportional to w. Thus, there are trade-offs in interconnect density, length, and power, and these trade-offs are fairly fundamental, being based on dielectric permittivity and conductor (e.g. copper) resistance.

For electrical interconnects, these fundamental interconnect limitations will constrain system performance and limit what is achievable even with so-called "more than Moore" 2.5D and 3D advanced packaging.

MULTI-LAYER PLANAR WAVEGUIDE INTERCONNECTS

CROSS-REFERENCE TO RELATED APPLICATION(S)

This application claims the benefit of U.S. Provisional Patent Application No. 63/086,365, filed on Oct. 1, 2020, the disclosure of which is incorporated by reference herein.

BACKGROUND OF THE INVENTION

The present invention relates generally to optical interconnects, and more particularly to optical interconnects using multi-planar waveguides.

The desire for high-performance computing and networking is ubiquitous and ever-increasing. Prominent applications include data center servers, high-performance computing clusters, artificial neural networks, and network switches.

For decades, dramatic integrated circuit (IC) performance and cost improvements were driven by shrinking transistor dimensions combined with increasing die sizes, summarized in the famous Moore's Law. Transistor counts in the billions have allowed consolidation onto a single system-on-a-chip (SoC) of functionality that was previously fragmented across multiple ICs.

However, the benefits of further transistor shrinks are decreasing dramatically as decreasing marginal performance benefits combine with decreased yields and increased per-transistor costs. Independent of these limitations, a single IC can only contain so much functionality, and that functionality is constrained because the IC's process cannot be simultaneously optimized for different functionality, e.g. logic, DRAM, and I/O.

In fact, there are significant benefits to "de-integrating" SoCs into smaller "chiplets", including: the process for each chiplet being optimized to its function (e.g. logic, DRAM, high-speed I/O, etc.), chiplets being well-suited to reuse in multiple designs, chiplets being less expensive to design, and chiplets having higher yield because they are smaller with fewer devices.

However, a major drawback to chiplets compared to SoCs is that chiplets require far more chip-to-chip connections. Compared to the on-chip connections between functional blocks in SoCs, chip-to-chip connections are typically much less dense and require far more power (normalized as energy per bit).

State-of-the-art chip-to-chip interconnects employ interposers and bridges, where the chips are flip-chip bonded to a substrate that contains the chip-to-chip electrical traces. While such interconnects provide far higher density and far lower power than interconnects of packaged chips via a printed circuit board (PCB), they still fall very far short of what is desired: chip-to-chip interconnects that approach the density and power dissipation of intra-chip interconnects.

The power and maximum distance of electrical interconnects is fundamentally limited by capacitance and conductor resistance. Interconnect density is limited by conductor width and layer count. The capacitance C of short electrical interconnects is proportional to interconnect length and approximately independent of conductor width w (assuming dielectric thickness scales approximately proportionately. The resistance R of electrical connections, and thus the maximum length (limited by RC) is inversely proportional to the conductor cross-sectional area, which scales as $w^2$. The density of electrical connections is inversely propor-

BRIEF SUMMARY OF THE INVENTION

Some embodiments provide a multilayer optical interconnect for integrated circuits, comprising: a first transceiver array, the first transceiver array having a first plurality of microLEDs and a first plurality of photodetectors, the first plurality of microLEDs being mounted to a first substrate, the first plurality of photodetectors being in or mounted to the first substrate; a second transceiver array, the second transceiver array having a second plurality of microLEDs and a second plurality of photodetectors, the second plurality of microLEDs being mounted to a second substrate, the second plurality of photodetectors being in or mounted to the second substrate; a multilayer planar waveguide coupling light from the first plurality of microLEDs with the second plurality of photodetectors and coupling light from the second plurality of microLEDs with the first plurality of photodetectors, the multilayer planar waveguide on a third substrate, the third substrate defining a plane parallel to a plane defined by the first substrate and a plane defined by the second substrate, the multilayer planar waveguide including a plurality of layers each parallel to the plane defined by the third substrate, each layer including a plurality of waveguides.

In some embodiments the multilayer planar waveguide comprises silicon dioxide ($SiO_2$) deposited on the third substrate. In some embodiments the multilayer planar waveguide comprises a polymer. Some embodiments further comprise at least one first reflector for coupling light between the first transceiver array and the waveguides of the multilayer planar waveguide, and further comprising at least one second reflector for coupling light between the second transceiver array and the waveguides of the multilayer planar waveguide. In some embodiments the first substrate comprises a first integrated circuit chip and the second substrate comprises a second integrated circuit chip. In some embodiments the first substrate and the second substrate are a same substrate, the same substrate comprising an integrated circuit chip. In some embodiments the multilayer planar waveguide comprises a plurality of cladding layers interspersed by a plurality of core layers.

Some embodiments provide a multi-layer planar interconnect comprising: a first optical transceiver array comprising a plurality of first microLEDs, first transmitter circuitry for the plurality of first microLEDs, a plurality of first photodetectors, and first receiver circuitry for the plurality of first photodetectors; a second optical transceiver array comprising a plurality of second microLEDs, second transmitter circuitry for the plurality of second microLEDs, a plurality of second photodetectors, and second receiver circuitry for the plurality of second photodetectors; and a multi-layer planar waveguide array, comprised of multiple layers of waveguides, each layer including a plurality of waveguides, coupling the first optical transceiver array and the second optical transceiver array.

Some embodiments further comprise: a first optical layer-shift array coupled between the first optical transceiver array and the multi-layer planar waveguide array, the first optical layer-shift array configured to transfer light between the first optical transceiver array the multi-planar waveguide array; and a second optical layer-shift array; and a second optical layer-shift array coupled between the second optical transceiver array and the multi-layer planar waveguide array, the second optical layer-shift array configured to transfer light between the second optical transceiver array the multi-planar waveguide array. In some embodiments the multiple layers of waveguides each comprise of vertical and horizontal waveguide layers, and the first and second optical layer-shift arrays are configured to transfer light produced by the first and second optical transceiver arrays from the vertical waveguide layers to their respective horizontal waveguide layers. In some embodiments the first and second optical layer-shift arrays are each configured to transfer light from the vertical waveguide layer to their respective horizontal waveguide layers by at least one reflector. In some embodiments each of the at least one reflectors comprises a plurality of reflectors. In some embodiments at least some of the plurality of reflectors for each of the first and second optical layer-shift arrays are on different horizontal levels. In some embodiments the multiple waveguide layers each comprise a bottom cladding layer and a patterned core layer on the bottom cladding, the patterned core layer providing an array of rib waveguides. In some embodiments the multiple waveguide layers further comprise a fill cladding between the rib waveguides.

These and other aspects of the invention are more fully comprehended upon review of this disclosure.

BRIEF DESCRIPTION OF THE DRAWINGS

FIG. 4A shows an optical transceiver array embodiment, in accordance with aspects of the invention.

FIG. 4B shows a transmitter embodiment, in accordance with aspects of the invention.

FIG. 4C shows a receiver embodiment, in accordance with aspects of the invention.

FIG. 6A-C show examples of MicroLED optical assemblies, in accordance with aspects of the invention.

DETAILED DESCRIPTION

To the first order, the drive power and density of optical interconnects are independent of their lengths. With regard to density, multi-layer planar optical interconnects can achieve densities that are on the same order of the density of electrical interconnects. Additional layers also enable more complex connectivity that require waveguides to cross if routed on a single layer. Unlike electrical waveguides, it is possible to cross optical waveguides with low crosstalk and low loss, with crosstalk and loss being minimum for waveguides crossing at 90°. However, the crosstalk and losses may be significant after numerous crossings. Multiple waveguide layers enable complex connectivity while limiting or eliminating waveguide crossings.

Figure 1A:
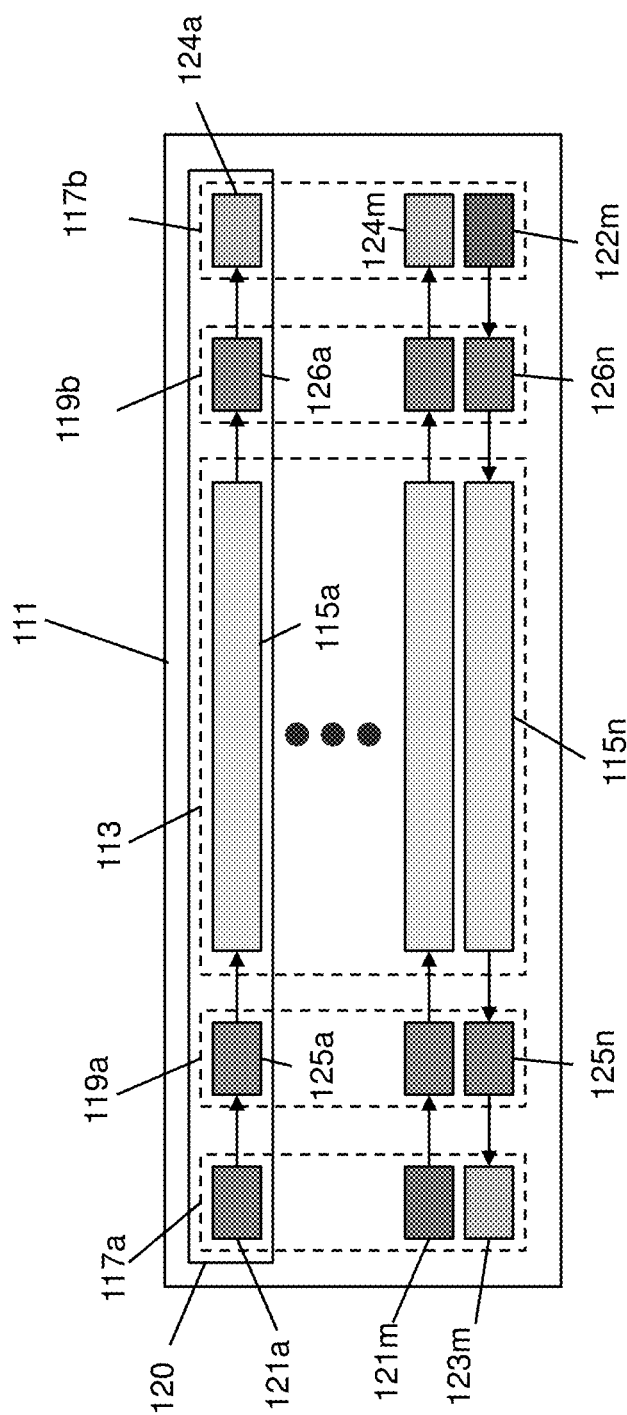
FIG. 1A shows a block diagram of a basic architecture of some embodiments of a multi-layer planar interconnect, in accordance with aspects of the invention.

The basic architecture of some embodiments of a multi-layer planar interconnect (MLPI) 111 is shown in FIG. 1A. The MLPI 111 also comprises a first optical transceiver array 117a that is optically coupled to a first optical layer-shift (OLS) array 119a, which is optically coupled to a multi-layer planar waveguide array (MLPWA) 113, which is optically coupled to a second OLS array 119b, which is optically coupled to a second optical transceiver array 117b. The MLPWA 113 comprises multiple layers, of which each layer comprises a one-dimensional (1D) array of waveguides.

Rather than being viewed as a series of connected arrays, in some embodiments, the MLPI 111 can be viewed as comprising an array of one or more channels, for example a channel 120. Channel 120 includes an optical transmitter (Tx) 121a of the first optical transceiver array, an OLS 125a of the first OLS array, an optical waveguide 115a of the multi-planar waveguide array, an OLS 126a of the second OLS array, and an optical receiver 124a of the second optical transceiver array. The MLPI of FIG. 1 includes a plurality of channels. As the MLPI of FIG. 1 is illustrated with each different waveguide as part of a unidirectional link, for links from the first optical transceiver array to the second optical transceiver array, each channel comprises an optical transmitter (Tx) 123a-m of the first optical transceiver array, every other OLS of the OLSs 125a-n of the first OLS array, every other optical waveguide of the waveguide array 115a-n, every other OLS of the OLSs 126a-n of the second OLS array, and an optical receiver (Rx) 124a-m. Similarly, for links from the second optical transceiver array to the first optical transceiver array, each channel comprises an optical transmitter (Tx) 122a-m of the second optical transceiver array, every other OLS of the OLSs 126a-n of the second OLS array, every other optical waveguide of the waveguide array 115a-n, every other OLS of the OLSs 125a-n of the first OLS array, and an optical receiver (Rx) 123a-m. Duplex communications may be effectively provided through the use of two channels, operating in reverse directions, for example the channel including optical transmitter 121m/optical receiver 124m and the channel including optical transmitter 122m/optical receiver 123m.

In some embodiments the optical transmitters use microLEDs as a light source. In some embodiments the optical receivers use photodetectors in converting optical signals generated by the microLEDs to electrical signals. In some embodiments the MLPI 111 is used to transport signals from one area of a semiconductor integrated circuit chip to another area of the semiconductor integrated circuit chip. In some embodiments the MLPI 111 is used to transport signals from one semiconductor integrated circuit chip of a multi-chip module to another semiconductor integrated circuit chip of the multi-chip module. The multi-chip module may, for example contain multiple semiconductor integrated circuit chips within a common semiconductor integrated package. In some embodiments the microLEDs and/or the photodetectors may be mounted on or within the semiconductor integrated circuit chip. In some embodiments the microLEDs and/or the photodetectors may be mounted on or within another chip, for example a chip including microLED driver circuitry and/or signal recovery circuitry.

In some embodiments a microLED is made from a p-n junction of a direct-bandgap semiconductor material. In some embodiments a microLED is distinguished from a semiconductor laser (SL) as follows: (1) a microLED does not have an optical resonator structure; (2) the optical output from a microLED is almost completely spontaneous emission, whereas the output from a SL is dominantly stimulated emission; (3) the optical output from a microLED is temporally and spatially incoherent, whereas the output from a SL has significant temporal and spatial coherence; (4) a microLED is designed to be driven down to a zero minimum current, whereas a SL is designed to be driven down to a minimum threshold current, which is typically at least 1 mA.

In some embodiments a microLED is distinguished from a standard LED by (1) having an emitting region of less than 10 μm×10 μm; (2) frequently having cathode and anode contacts on top and bottom surfaces, whereas a standard LED typically has both positive and negative contacts on a single surface; (3) typically being used in large arrays for display and interconnect applications.

Figure 1B:
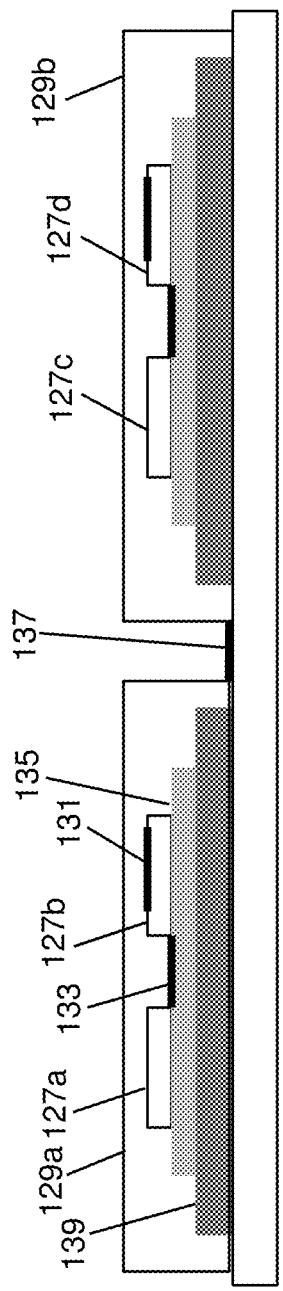
FIG. 1B shows in a semi-block diagram form a pair of multi-chip modules, with intra-chip optical interconnects, inter-chip intra-module optical interconnects, and inter-module optical interconnects, in accordance with aspects of the invention.

FIG. 1B illustrates in semi-block diagram form a pair of multi-chip modules, with intra-chip optical interconnects, inter-chip intra-module optical interconnects, and inter-module optical interconnects. The optical interconnects may be, for example, as discussed with respect to FIG. 1A and/or elsewhere herein. A multi-layer planar optical interconnect therefore can be used at various interconnect levels.

In the example of FIG. 1B, a first pair of integrated circuit chips 127a,b are in a first multi-chip module 129a, and a second pair of integrated circuit chips 127c,d are in a second multi-chip module 129b. In some embodiments an MLPI connects between different areas on the same integrated circuit (IC), e.g., an "intra-IC interconnect," for example as illustrated by MLPI 131 on the IC chip 127b. Such interconnects can serve as "express lanes," greatly reducing latency compared to an on-chip electronic interconnect, which may require tens of electrical regenerators such as flip-flops (and thus tens of clock cycles of latency) to traverse a large IC. In some embodiments thousands of these intra-chip optical interconnects may be used on a single IC.

In some embodiments, a MLPI connects between two ICs that are within the same multi-chip module (MCM), e.g., an "inter-IC interconnect." Such is illustrated, for example, by MLPI 133 connecting IC chips 127a,b. In FIG. 1B, the MLPI 133 is shown as being on an interposer 135, which the IC chips 127a,b are on. In some embodiments the multi-chip module 129a may not include an interposer 135, with for example the IC chips 127a,b being on a package substrate 139 (shown as below the interposer in FIG. 1B). In such embodiments, the MLPI 133 may be on or in the package substrate. While only a single inter-IC interconnect MLPI 133 is explicitly shown in FIG. 1B, in various embodiments each pair of IC chips may be connected by many thousands of optical interconnects.

In some embodiments, a MLPI connects between two different modules, e.g. an "inter-module interconnect," for example by MLPI 137 connecting the multi-chip modules 129a,b. In some embodiments the MLPI 137 is on a board or other substrate on which the multi-chip module are mounted.

Figure 2A:
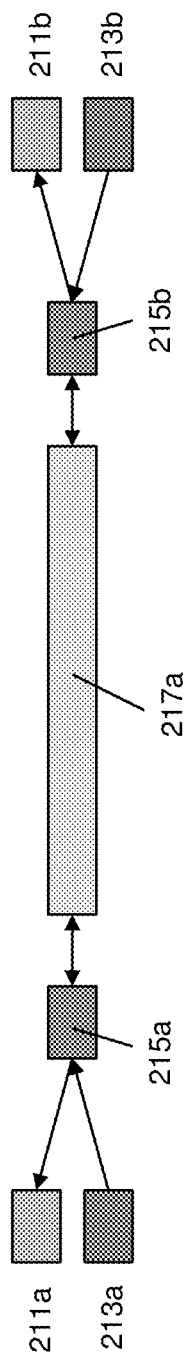
FIG. 2A shows a duplex multi-layer planar interconnect embodiment that allows for both light and counter-propagating light to travel through the waveguide of the multi-layer planar interconnect, in accordance with aspects of the invention.

FIG. 2A is a block diagram of a duplex MLPI embodiment that allows for both light and counter-propagating light to travel through the waveguide of the MLPI. In some embodiments, each waveguide carries light and counter-propagating light and supports a duplex link. The light and counter-propagating light may be produced from transmitters 213a and 213b, respectively. In some embodiments, the light can travel from transmitter 213a through an OLS 215a prior to being coupled into a first end of a waveguide 217a and coming out a second end of the waveguide 217a and traveling through another OLS 215b prior to coupling into a receiver 211b. Similarly, the counter-propagating light can travel from transmitter 213b through an OLS 215b prior to being coupled into the second end of the waveguide 217a and coming out the first end of the waveguide 217a and traveling through another OLS 215a prior to coupling into a receiver 211a.

Figure 2B:
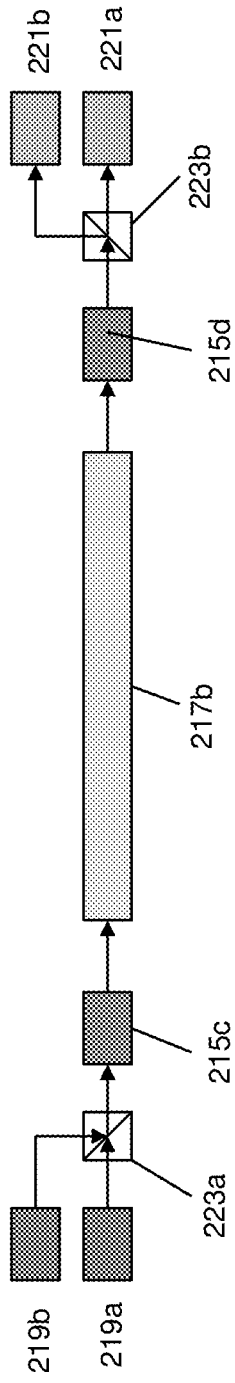
FIG. 2B shows a multi-layer planar interconnect embodiment including a polarizing beam splitter, in accordance with aspects of the invention.

FIG. 2B shows an MLPI embodiment comprising of at least one polarizing beam splitter that increases the data carrying capacity of the system. In some embodiments, two signals may be polarization-multiplexed in each waveguide. FIG. 2B shows two transmitters, Tx1 219*a* and Tx2 219*b*, whose optical outputs are combined using a polarizing beam splitter (PBS) 223*a* and coupled into one end of a waveguide 217*b*. In some embodiments, the combined optical outputs pass through an OLS 215*c* prior to being coupled into one end of a waveguide 217*b*. At the other end of the waveguide, the light is coupled into a PBS 223*b* that separates out the two polarizations and couples each to a different receiver 221*a,b*. In some embodiments, the light passes through an OLS 215*d* prior to being coupled into a PBS 223*b* that separates out the two polarizations and couples each to a different receiver 221*a,b*. Because each of the two orthogonal polarizations carries an independent data stream, the data carrying capacity of a system for a given number of waveguides is doubled compared to a system that does not exploit polarization multiplexing.

Figure 2C:
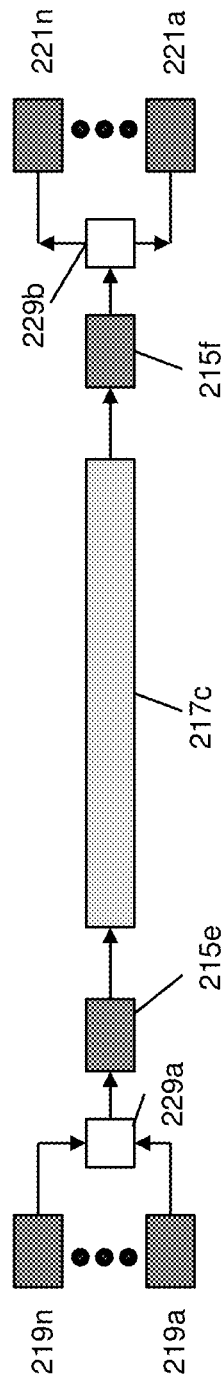
FIG. 2C shows a multi-layer planar interconnect embodiment comprising at least one wavelength division multiplexer and wavelength demultiplexer, in accordance with aspects of the invention.

FIG. 2C shows an MLPI embodiment comprising at least one wavelength division multiplexer and wavelength demultiplexer. In some embodiments, signals may be wavelength division multiplexed (WDM). FIG. 2C shows N transmitters 219*a-n*, each of which may transmit light at a different, non-overlapping range of wavelengths. The optical outputs of the transmitters are combined using a wavelength multiplexer 229*a* and coupled into one end of a waveguide 217*c*. In some embodiments, the combined optical outputs go through an OLS 215*e* prior to being coupled into one end of a waveguide 217*c*. At the other end of the waveguide 217*c*, the light is coupled into a wavelength demultiplexer 229*b* that separates out the two polarizations and couples each to a different receiver 221*a-n*. In some embodiments, the light goes through an OLS 215*f* prior to being coupled into a wavelength demultiplexer 229*b* that separates out the two polarizations and couples each to a different receiver 221*a-n*. The waveguide carries N independent signals, and the data carrying capacity of a system for a given number of waveguides is increased N times compared to a system that does not exploit WDM. In some embodiments, the wavelength multiplexer 229*a* and demultiplexer 229*b* are formed from multi-layer thin-film dielectric filters.

Figures 3A, 3B, 3C, 3D:
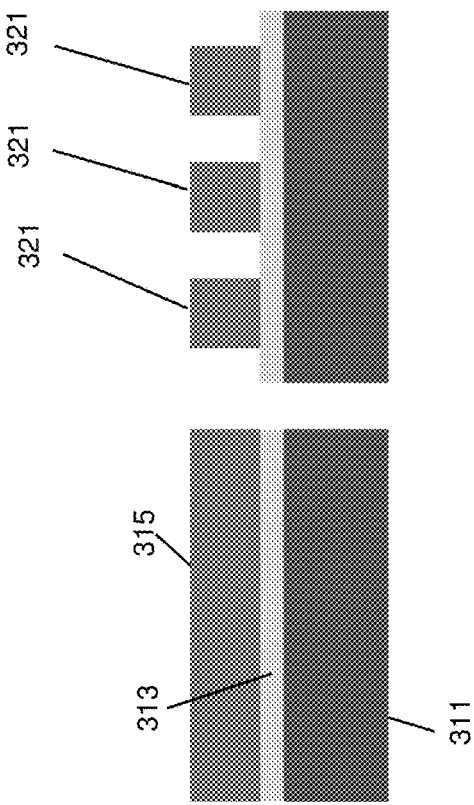
FIG. 3A shows a side-view of one embodiment of a multi-layer planar waveguide array that may be used in the multi-layer planar interconnect, in accordance with aspects of the invention.
FIG. 3B shows a cross-sectional view of one embodiment of a multi-layer planar waveguide array including an array of rib waveguides, in accordance with aspects of the invention.
FIG. 3C shows a cross-sectional view of one embodiment of a multi-layer planar waveguide array, in accordance with aspects of the invention.
FIG. 3D shows a cross sectional area of one embodiment of a multi-layer planar waveguide array with multiple waveguide layers, in accordance with aspects of the invention.

FIG. 3A shows a side-view of one embodiment of a multi-layer planar waveguide array (MLPWA) used in the MLPI. A MLPWA 113 may be fabricated using a variety of materials and processes on various substrates. For instance, to create a waveguide layer, a base cladding layer 313 may be deposited on a substrate 311, followed by deposition of a core layer 315 that is patterned and processed to leave an array of rib waveguides 321, with spaces between the ribs, as seen in FIG. 3B). Methods for patterning the core layer 315 include optical lithography and micro-imprint lithography. A fill cladding layer 317 may then be deposited that serves as the cladding for the sides and top of the waveguide, as seen in FIG. 3C that shows a cross-sectional view of one embodiment of an MLPWA. A subsequent planarization process may be done to create a planar surface, for instance through a polishing or etching process. As seen in FIG. 3D, in layers 1 319*a* through N 319*n*, the top cladding of the previous layer can serve as the bottom cladding, so those layers do not require the deposition of an additional bottom cladding. The other fabrication steps are the same for the upper layers.

In this disclosure, the term "waveguide" is sometimes used interchangeably with "waveguide core" or "core."

In some embodiments, the various waveguides layers are made from polymer materials and deposited using a spin-on process. In some embodiments, the various waveguides layers 319*a-n* are made from $SiO_2$ that is deposited using a chemical vapor deposition (CVD) or flame hydrolysis deposition (FHD) process. In some embodiments, the various waveguide layers 319*a-n* are made from SiN or SiON and that is deposited using plasma-enhanced chemical vapor deposition (PECVD). In some embodiments that utilize a silicon substrate, the base cladding 313 of the bottom waveguide layer 319*a* is created by oxidizing the surface of the silicon to create a $SiO_2$ layer.

In some embodiments, the MLPWA is fabricated on a silicon substrate. In some embodiments, the MLPWA is fabricated on a glass substrate. In some embodiments, the MLPWA is fabricated on a ceramic substrate. In some embodiments, the MLPWA is fabricated on a sapphire substrate. In some embodiments, the MLPWA is fabricated on a rigid polymer substrate. In some embodiments, the MLPWA is fabricated on a flexible polymer substrate.

In some embodiments, waveguides are fabricated by focusing high intensity UV radiation to a small beam waist in a transparent glass material, causing optical "damage" to the material and increasing its index of refraction in the beam waist region; for instance, the light from a high power excimer laser can be focused into borosilicate glass. By moving the UV focal spot, waveguides can be "written" into the material. By writing waveguides at various levels within the glass, multiple layers of waveguides can be fabricated.

In some embodiments, highly absorbing materials may be inserted in various locations in the MLPWA to reduce optical crosstalk from any light propagating outside of the cores. As one would understand, the absorbing materials would absorb light, or at least light at wavelengths of interest, for example wavelengths which generate current in the photodetectors. In some embodiments, some of the waveguides may be "black" waveguides that are highly absorbing for the transmitted wavelength. In some embodiments, a highly absorbing material may be inserted at the boundary between waveguide layers 319*a-n*; in some embodiments, this highly absorbing material may be a metal.

FIG. 4A shows a block diagram of an example optical transceiver array 411. The optical transceiver array of FIG. 4A includes a plurality of optical transmitters 413*a-n* and a plurality of optical receivers 415*a-n*. The optical transmitters 413*a-n* receive electrical signals and generate light signals encoding data of the electrical signals. The optical receivers 415*a-n* receive light signals and generate electrical signals encoding data of the light signals. An optical interconnect channel comprises an optical transmitter in one transceiver array that is optically connected to an optical receiver in the other transceiver array.

In some embodiments, an optical transceiver array 411 comprises a 1-dimensional (1D) array. In some embodiments, an optical transceiver array 411 comprises a 2-dimensional (2D) array. In some embodiments, elements of a 2D optical transceiver array are arranged on a square or rectangular grid. In some embodiments, the elements of a 2D optical transceiver array are arranged on a hexagonal close-packed grid.

Figure 5:
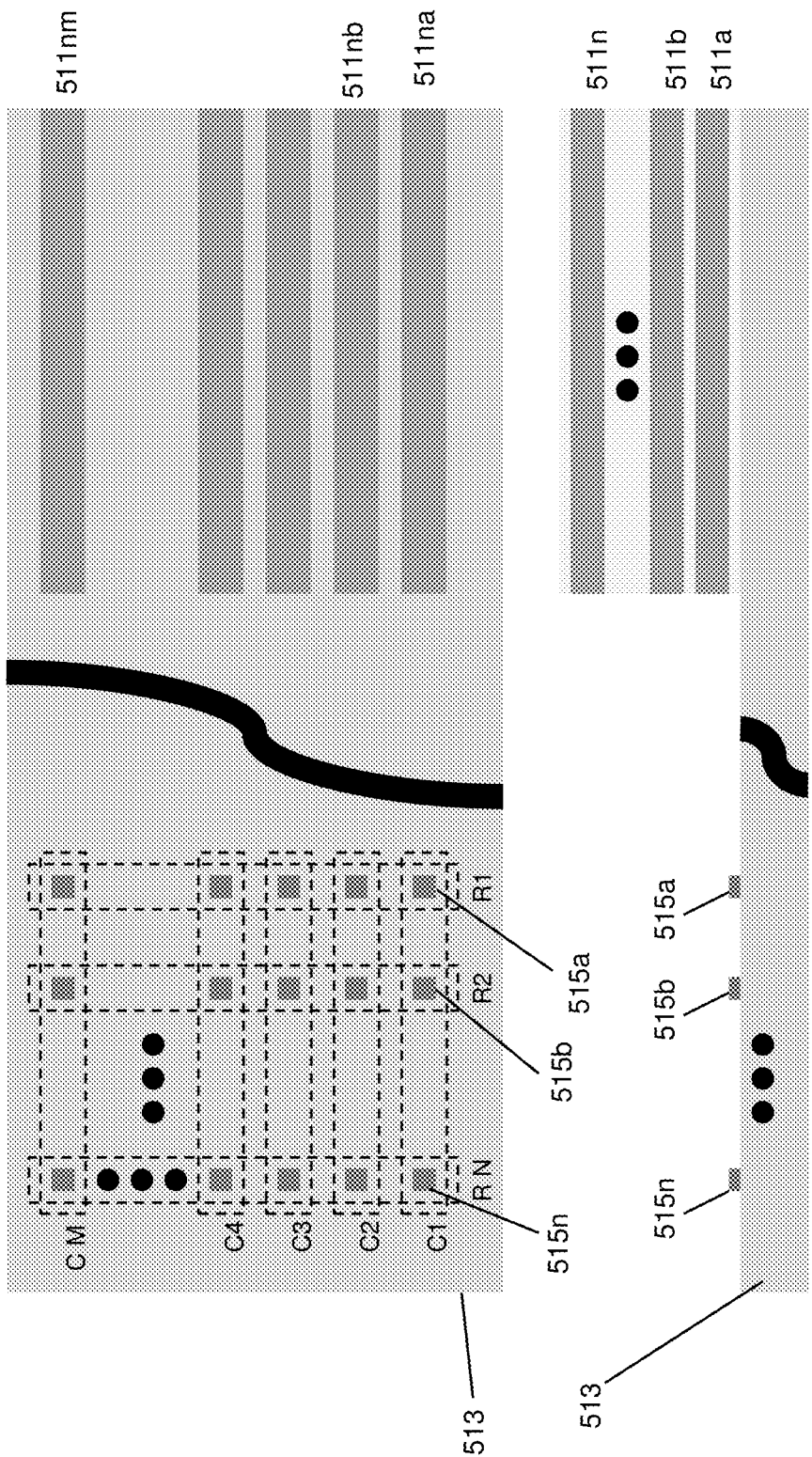
FIG. 5 shows an optical transceiver array embodiment, in accordance with aspects of the invention.

FIG. 5 shows side and top views of an optical transceiver (TR) array embodiment. In some embodiments of an optical transceiver (TR) array 411, such as in FIG. 4A, TR elements are mounted to a planar substrate 513 and arranged in N rows with M elements in each row, where each TR element is either a Tx 413*a-n* or an Rx 415*a-n*. In the subsequent descriptions, the row numbering convention will be that the row closest to the waveguides is row 1 (R1) 515*a* with row numbers incrementing with distance from the waveguides up to row N (RN) 515*n*. The waveguide layer numbering convention will be that the layer closest to the substrate 513 is layer 1 (L1) 511a with layer numbers incrementing for each additional layer up to layer N (LN) 511n. Layer N, for example, may include waveguides 511na-511nm, with one waveguide for each of the M elements in a row of TR elements.

FIG. 4B shows a transmitter (Tx) embodiment. For the purposes of this disclosure, the transmitter (Tx) 413a-n of each channel comprises transmitter circuitry 417 and a microLED optical assembly (MOA) 419. In some embodiments, the MOA 419 comprises a microLED 421 and transmitter light collection optics (TLCOs) 423 that collect the light emitted by the microLED 421 to improve optical coupling efficiency to the rest of the optical interconnect. The output of the Tx circuitry 417 is connected to the electrical input of the microLED 421. The Tx circuitry 417 drives the microLED 421 at current and voltage levels that generate the desired optical output signal. The Tx circuitry 417 may also comprise emphasis/equalization circuits, and digital control and monitoring circuits.

In some embodiments, the microLED 421 is made from GaN, where the active emitting region of the microLED 421 comprises one or more InGaN quantum wells. In some embodiments, the light collection optics 423 preferentially cause light to propagate in a direction normal to the microLED 421 surface. In some embodiments, the TLCOs 423 preferentially cause light to propagate in a direction parallel to the microLED surface.

FIG. 4C shows a receiver (Rx) embodiment. For the purposes of this disclosure, the receiver (Rx) 415a-n of each channel of a parallel microLED interconnect comprises a photodetector optical assembly (POA) 425 and receiver circuitry 427. The POA 425 comprises receiver light collection optics (RLCOs) 429 and a photodetector (PD) 431, which may be a photodiode. The RLCOs 429 enable input light from the optical system to be more efficiently coupled to the photodetector (PD) 431. In some embodiments a RLCO and a TLCO may be combined in a single structure. The electrical output of the PD 431 is connected to the input of the receiver circuitry 427. The Rx circuitry 427 may comprise a transimpedance amplifier (TIA) followed by other circuits that may amplify the signal to logic levels and/or allow subsequent loads to be driven. The Rx circuitry 427 may also include equalization, and digital control and monitoring circuits.

Silicon PDs may be particularly advantageous for use in optical links using microLEDs made from GaN and emitting light at wavelengths of less than 500 nm. In particular, for wavelengths of less than 450 nm, the absorption length in a silicon photodetector is a few tenths of a micron. This allows fabrication of simple PD structures that are compatible with standard CMOS fabrication processes. In some embodiments of a PMI receiver, a silicon PD is monolithically integrated with receiver circuitry 427. This enables very compact, inexpensive, high-performance receiver implementations. In some embodiments, the RLCOs 429 preferentially collect light incident in a direction normal to the PD 431 surface. In some embodiments, the RLCOs 429 preferentially collect light incident in a direction parallel to the PD 431 surface.

FIGS. 6A, 6B, and 6C show MicroLED optical assembly (MOA) embodiments. There are numerous possible embodiments of a MOA 419 optimized for launching light normal to the microLED surface. In some embodiments, the microLED 611a is mounted to a substrate 613a on which the transmitter light collection optics (TLCOs) 423 are also mounted. In some embodiments, as seen in FIG. 6A, the TLCOs 423 comprise a lens 617a formed from some optically transparent encapsulant 615a that encapsulates the microLED 611a. Encasing the microLED 611a in a transparent encapsulant can increase the light extraction efficiency (LEE) from the microLED 611a by reducing the amount of total internal reflection (TIR) within the microLED 611a.

In some embodiments, the TLCOs 423 comprise a reflector structure 619b. The reflector structure 619b may comprise a sloping surface that is made to be highly reflective, for instance by deposition of a highly reflective metal such as aluminum. In some embodiments, the cross-section of FIG. 6B shows a microLED 611b on a substrate 613b. Reflective surfaces 619b slope away from the microLED 611b with increasing distance from the substrate 613b. In FIG. 6B, the microLED 611b is shown as being in a gap of a dielectric layer 621b on the substrate 613b, with the gap increasing in width with distance from the substrate 613b. The reflective surfaces 619b is on the dielectric layer 621b, and the gap may be filled with encapsulant 615b to encapsulate the microLED 611b.

The reflector structure 619b is effective in collecting light that is propagating at large angles relative to the microLED surface normal. In some embodiments, the reflector surface is part of a cone of revolution such that a 2D projection is a line. In some embodiments, the reflector surface is part of a parabola of revolution such that a 2D projection is a parabola. In some embodiments, the reflector structure 619b is fabricated by depositing a layer of a dielectric material 621b and then selectively etching away the dielectric to define the surfaces of the reflector.

In some embodiments, the cavity that defines the reflector structure is filled in with an encapsulant 615c that covers the microLED 611c. In further embodiments, as seen in FIG. 6C, a lens 617c is formed at the top of the encapsulant layer filling the reflector cavity such that the collection optics comprise both a reflector 619c and a lens 617c. In some embodiments, the microLED 611c is mounted to the substrate 613c along with the reflector 619c, an encapsulant 615c, a lens 617c, and a dielectric layer 621c.

Figure 7A:
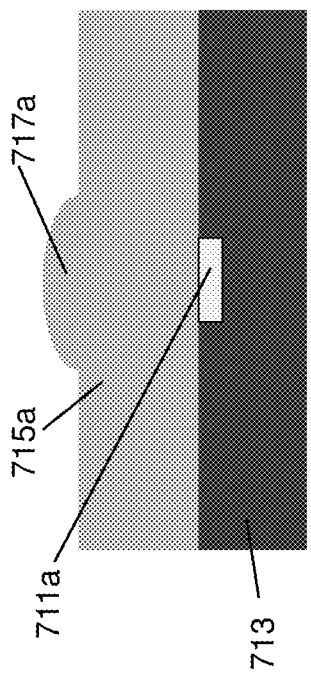
FIG. 7A-C show examples of photodetector optical assemblies embodiment, in accordance with aspects of the invention.
Figure 7C:
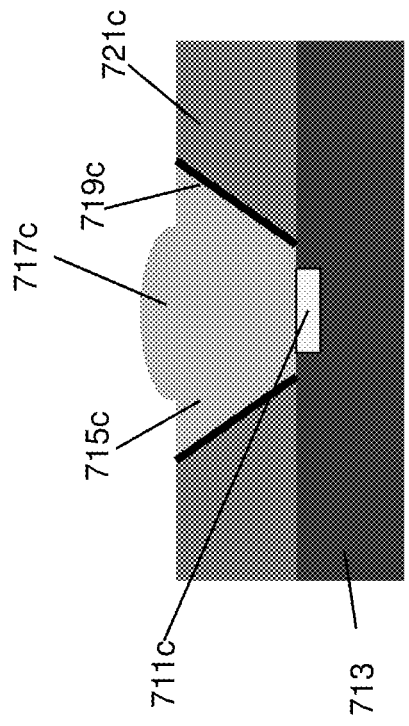
Figure 7B:
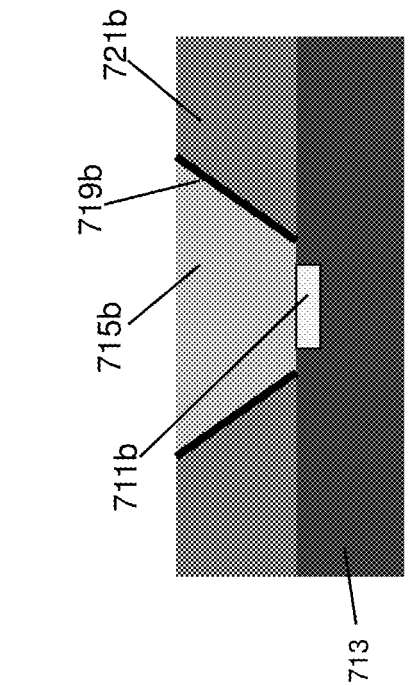

FIGS. 7A, 7B, and 7C show photodetector optical assembly (POA) embodiments. There are numerous possible embodiments of a POA optimized for receiving light normal to the PD surface. An assembly comprising a PD and RLCOs that is optimized for preferentially collecting light incident in a direction normal to the PD surface can be realized in numerous ways. In some embodiments, the RLCOs 429 are fabricated on the same substrate 713 in which the PD is fabricated.

In some embodiments, as seen in FIG. 7A, the RLCOs 429 comprise a lens 717a formed from some optically transparent encapsulant 715a that encapsulates the PD 711a. Encasing the PD 711a in a transparent encapsulant 715a can decrease optical reflections at the PD surface, improving overall PD quantum efficiency. In some embodiments, as seen in FIG. 7B, the RLCOs 429 comprise a reflector structure 719b. The reflector structure comprises a structure with a sloping surface that is made to be highly reflective, for instance by deposition of a highly reflective metal such as aluminum. The reflector structure 719b is effective in collecting light that is propagating at large angles relative to the PD surface normal. In some embodiments, the reflector surface is part of a cone of revolution such that a 2D projection is a line. In some embodiments, the reflector surface is part of a parabola of revolution such that a 2D projection is a parabola. In some embodiments, the reflector structure 719b is fabricated by depositing a layer of a dielectric material 721b, c and then selectively etching away the dielectric to define the surfaces of the reflector. In some embodiments, the cavity that defines the reflector structure is filled in with an encapsulant 715b that covers the PD 711b. In further embodiments, as seen in FIG. 7C, a lens 717c is formed at the top of the PD 711c and the encapsulant layer 715c filling the reflector cavity such that the collection optics comprise both a reflector 719c and a lens 717c.

Figure 8C:
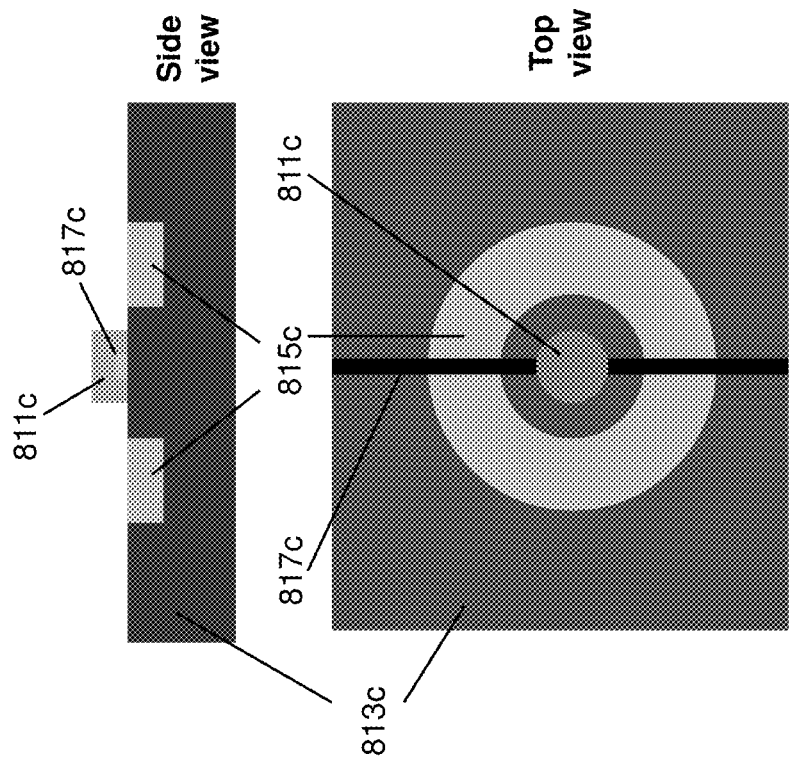
FIG. 8C shows a side and top-view of a duplex transceiver embodiment wherein the photodetector is annular shaped, in accordance with aspects of the invention.
Figure 8A:
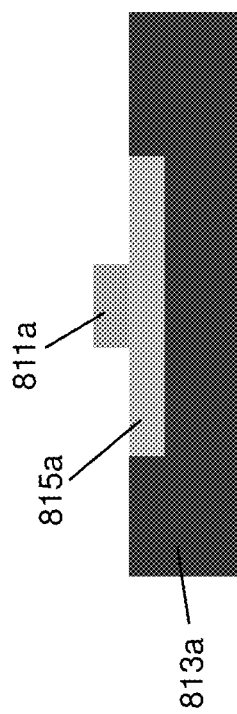
FIG. 8A shows a duplex transceiver embodiment wherein the microLED is mounted to a larger photodetector, in accordance with aspects of the invention.
Figure 8B:
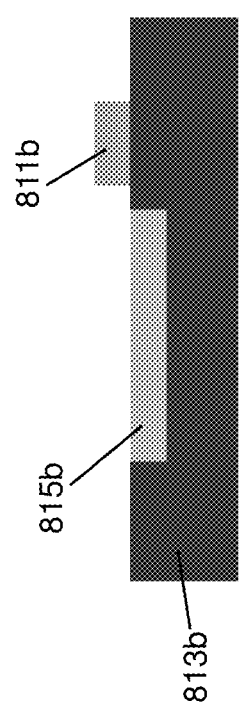
FIG. 8B shows a duplex transceiver embodiment wherein the microLED is mounted to a substrate next to a larger photodetector, in accordance with aspects of the invention.

FIGS. 8A, 8B, and 8C show duplex transceiver embodiments. Duplex optical waveguide links exploit light propagating in both directions through a waveguide to implement a bidirectional link using a single waveguide. A duplex connection in a single-mode waveguide must utilize elaborate measures such as different wavelengths or circulators must be employed to achieve low loss, high fidelity connections. By contrast, multimode duplex connections can exploit the increase in etendue between a microLED-based transmitter and the etendue at the receiver to implement simple, practical duplex links.

In a set of embodiments of a duplex transceiver, a microLED is mounted to a substrate in which a PD is fabricated. In some embodiments of a duplex transceiver, as seen in FIG. 8A, a microLED 811a is placed on top of a larger photodetector (PD) 815a that is mounted to a substrate 813a, where the microLED 811a is wholly over the PD 815a. The PD 815a, however, includes a detection surface with a larger area than that of the microLED 811a, such that the microLED 811a only covers a portion of the PD detection area and the PD 815a may receive light on portions of the surface not covered by the microLED 811a. In some embodiments, however, the microLED may partially cover the PD and partially cover the substrate. In some embodiments, as seen in FIG. 8C, electrical connections 817c from transceiver circuitry to the microLED 811c may be made over the top surface of the photodetector 815c. In some embodiments, the PD is fabricated in a silicon substrate that also contains transmitter and receiver circuitry.

The light from the microLED can be efficiently coupled into the waveguide via various optical coupling schemes such as those discussed above for microLED optical assemblies, including a lens and/or reflecting optical collector. Light propagating in the waveguide toward the duplex transceiver can be efficiently coupled to the larger photodetector. Received light impinging on the microLED will not be received by the photodetector and therefore contribute to the link loss. However, if the LED area is small compared to the photodetector area and the light is well-distributed across the photodetector, this loss contribution will be small. For instance, if the microLED is 2 um×2 um and the photodetector is 6 um×6 um with the light uniformly distributed across the photodetector, this will cause a loss of −10*log 10((6×6−2×2)/(6×6))=0.51 dB.

In some embodiments of a duplex transceiver, as seen in FIG. 8B, a microLED 811b is mounted to a substrate 813b next to a larger PD 815b. In some embodiments of a duplex transceiver 819c, as seen in FIG. 8C, a microLED 811c is mounted to a substrate 813c where it is surrounded by a PD 815c; for instance, the PD 815c may be annular in shape.

In a set of embodiments, duplex microLED/PD embodiments can be substituted for microLED-only or PD-only embodiments, and vice versa.

Figure 9B:
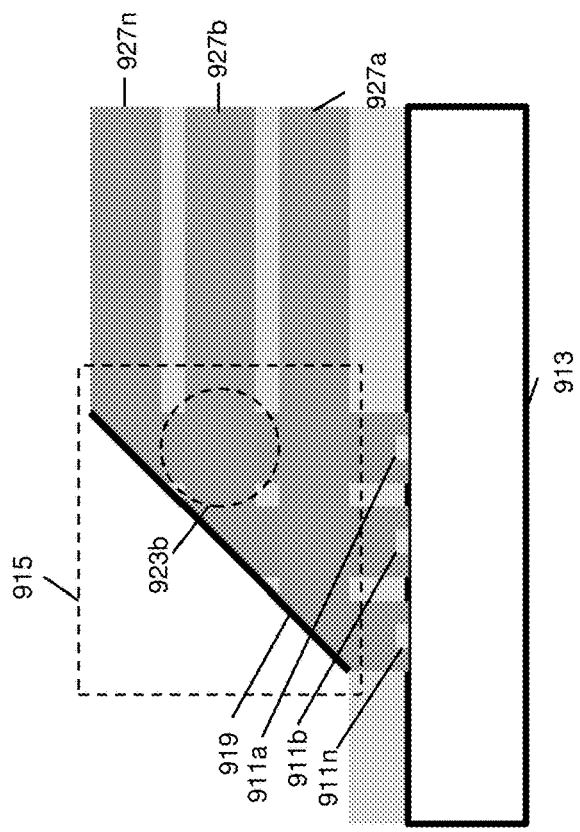
FIG. 9B shows another embodiment of a multi-layer planar waveguide array, in accordance with aspects of the invention.
Figure 9A:
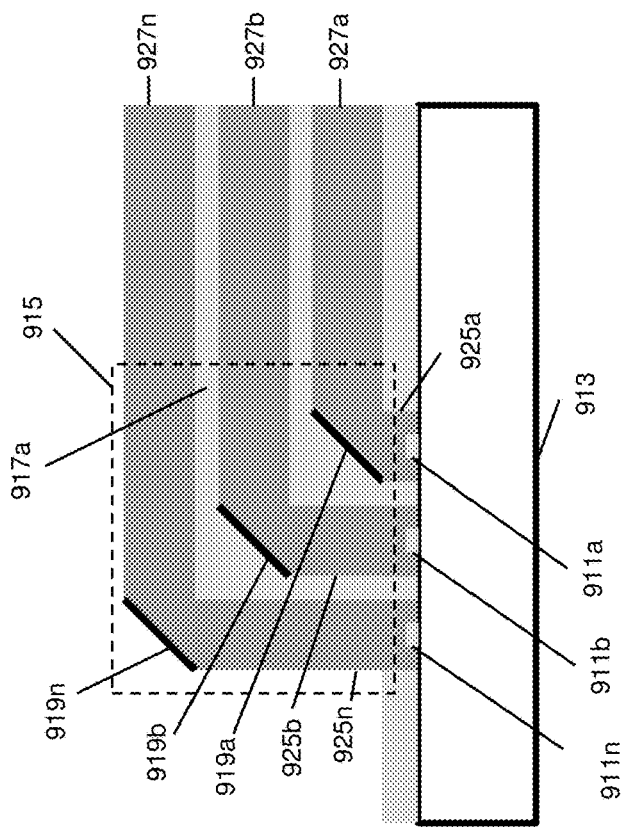
FIG. 9A shows one embodiment of a multi-layer planar waveguide array, in accordance with aspects of the invention.

FIGS. 9A and 9B show embodiments of an MLPWA. In some embodiments of an MLPI, the TR elements are mounted to a planar substrate 913 and optical layer shift (OLS) 915 is used to translate light from the level of each TR element to the level of the waveguide that is being used for its respective channel.

In some embodiments, as seen in FIG. 9A, TR elements in rows 911a-n are attached to a substrate 913 and, in some embodiments, encapsulated in a corresponding vertical waveguide 925a-n. The microLEDs emit light preferentially normal to the substrate surface and the PDs receive light preferentially from normal to the PD surface. A turning mirror 919a-n in each waveguide reflects the light so it is coupled into waveguides of horizontal waveguide layers 927a-n that are parallel to the substrate surface. TR row 1 (R1), with microLED 911a visible in FIG. 9A, is coupled to waveguide layer 1 (L1), with waveguide 927a visible in FIG. 9A, TR row 2 (R2), with microLED 911b is coupled to waveguide layer 2 (L2), with waveguide 927b visible in FIG. 9A, and so on such that the Rn, with microLED 927n visible in FIG. 9, is coupled into Ln, with waveguide 927n visible in FIG. 9A. In some embodiments, each of the vertical waveguides and horizontal waveguides are comprised of a core, with the waveguide layers are separated from each other by cladding layers, for example cladding layer 917a. In some embodiments, the turning mirrors 919a-n may be orientated at an angle near a boundary of the waveguide's core 921a.

Alternatively, TR row 1 (R1) may be coupled to vertical waveguide layer N (LN), R2 may be coupled to L(N−1), and so on such that Rn is coupled into waveguide layer L(N−n+1). This may be accomplished using a turning mirror in each waveguide, or, for example, a single turning mirror 919 that extends across all of the waveguides, as seen in FIG. 9B. This causes numerous waveguide intersections, for example waveguide intersection 923b, with R1 vertical waveguides 925d and L1 horizontal waveguides 927d encountering the most intersections. If the NA of the waveguides is less than 45° and intersection corners are sharp, the crosstalk between crossing waveguides can be made low. Lower NA also reduces the loss associated with the waveguide crossings. The trade-off is that the coupling loss from TR elements to lower NA waveguides is higher.

Figure 10A:
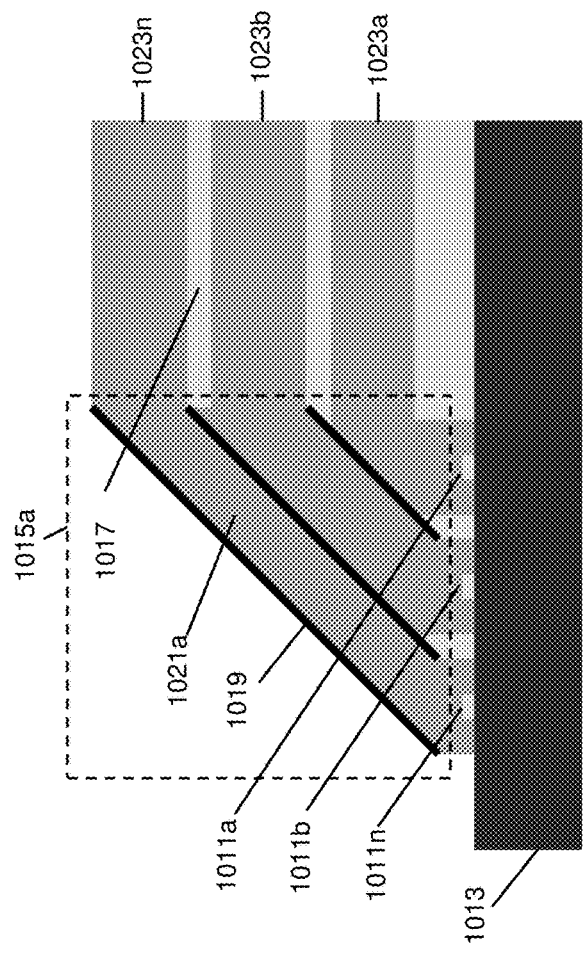
FIG. 10A shows another embodiment of a multi-layer planar waveguide array, in accordance with aspects of the invention.
Figure 10B:
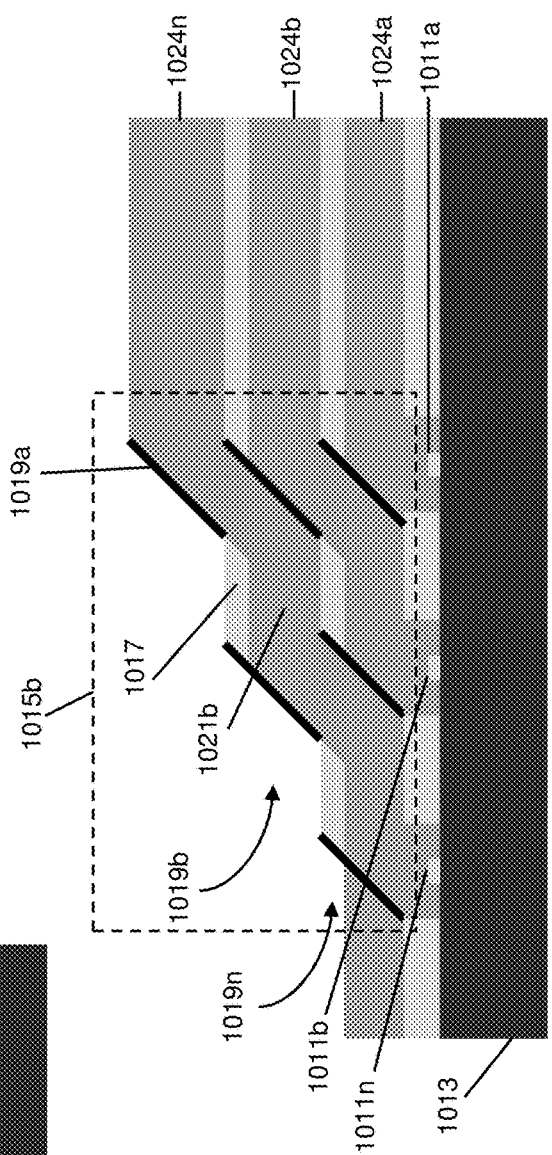
FIG. 10B shows another embodiment of a multi-layer planar waveguide array, in accordance with aspects of the invention.

FIGS. 10A and 10B show other embodiments of an MLPWA. In some embodiments, The TR elements 1011a-n are on a substrate 1013, and embedded in either horizontal or vertical waveguides, where the TR elements 1011a-n couple preferentially in the direction of the waveguide's propagation axis. In some embodiments, as seen in FIG. 10A, an OLS 1015a is comprised of a plurality of turning mirrors, for example turning mirror 1019a, that translates light propagating vertically from the TR elements, for example TR element 1011n, to a horizontal direction at a level of the corresponding waveguide layer, for example into waveguide layer 1023n. Near where each TR element launches into its waveguide, the waveguide slopes up at approximately 45° relative to the substrate surface 1013a until reaching the layer of its associated horizontal waveguide. In some embodiments, turning mirrors such as 1019 may be at boundaries of the waveguide layers, where the waveguides slope up relative to the substrate surface 1013. TR row 1 (R1) 1011a is coupled to waveguide layer 1 (L1) 1023a, R2 1011b is coupled to L2 1023b, and so on such that the Rn 1011n is coupled into Ln 1023n. In some embodiments, each of the waveguide layers 1023a-n are comprised of a core separated by cladding, for example cladding 1017. In some embodiments, as seen in FIG. 10B, an OLS 1015b integrated in the MLPWA is comprised of turning mirrors so that each row of TR elements 1011a-n encounters a first level of turning mirrors 1019n at the level of waveguide layer 1 1024ac. The light from TR rows 2 to N subsequently encounters a pair of turning mirrors 1019b that translate the light to waveguide layer 2 1023d. For each successive higher-numbered row, the light from TR rows n to N encounters a pair of turning mirrors that translates the light to the nth waveguide layer.

Figure 11:
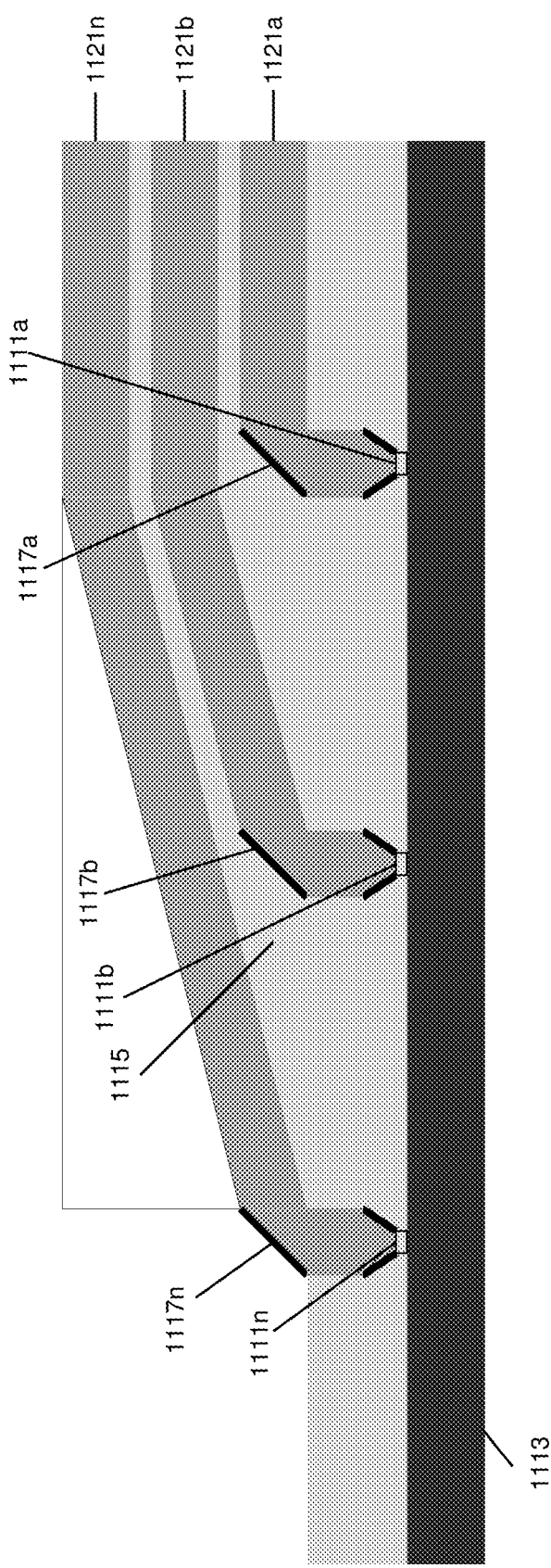
FIG. 11 shows another embodiment of a multi-layer planar waveguide array, in accordance with aspects of the invention.

FIG. 11 shows another embodiment of an MLPWA. In some embodiments, the TR elements of rows 1111a-n are on a substrate 1113 and embedded in either horizontal or vertical portions of waveguides of waveguide layers 1121a-n, where the TR elements couple preferentially in the direction of the waveguide's propagation axis. If the waveguide is vertical, turning mirrors 1117a-n reflect the light into a waveguide that is approximately parallel to the substrate surface 1113. Each waveguide then slopes gently up from the planar surface until reaching the layer of its associated horizontal waveguide 11. TR row 1 (R1) 1111a is coupled to waveguide layer 1 (L1) 1121a, R2 1111b is coupled to L2 1121b, and so on such that the Rn 1111n is coupled into Ln 1121n. In some embodiments, each of the waveguides are separated from each other by cladding 1115.

Figure 12:
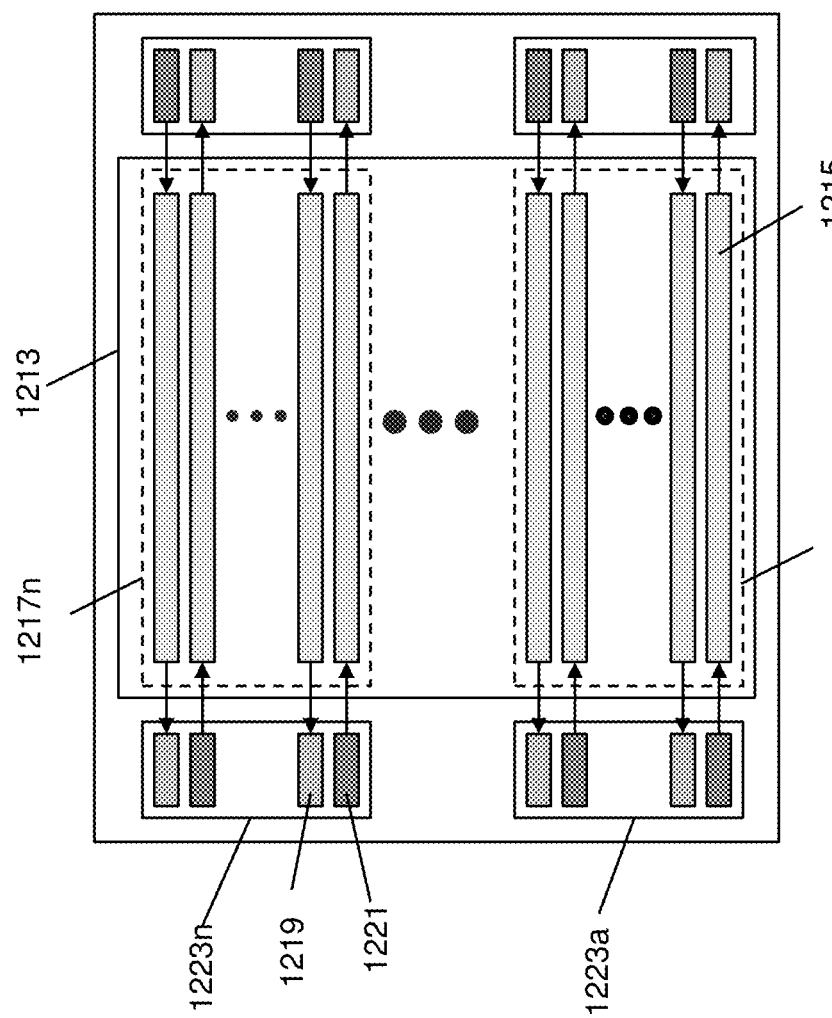
FIG. 12 shows a multi-level TR embodiment, in accordance with aspects of the invention.

FIG. 12 shows a Multi-level TR embodiment. In some embodiments of an MLPI 1211, the TR elements associated with each channel are mounted at vertical height that allows them to be directly coupled to their associated waveguide; these embodiments do not include OLS because there is no need for to shift the height of the light relative to the TR elements. As shown in FIG. 12, a plurality of arrays 1223a-n of TR elements are arranged at different heights. Each array includes a plurality of TR elements, with for example an Nth array of TR elements including an optical receiver 1219 and an optical transmitter 1221. Correspondingly, a multi-layer planar waveguide array 1213 includes a plurality of planar waveguide arrays 1217a-n, each having a plurality of waveguides 1215, in a layer at the height of each of the arrays of TR elements. The waveguides optically couple the TR elements with other TR elements.

Figure 13B:
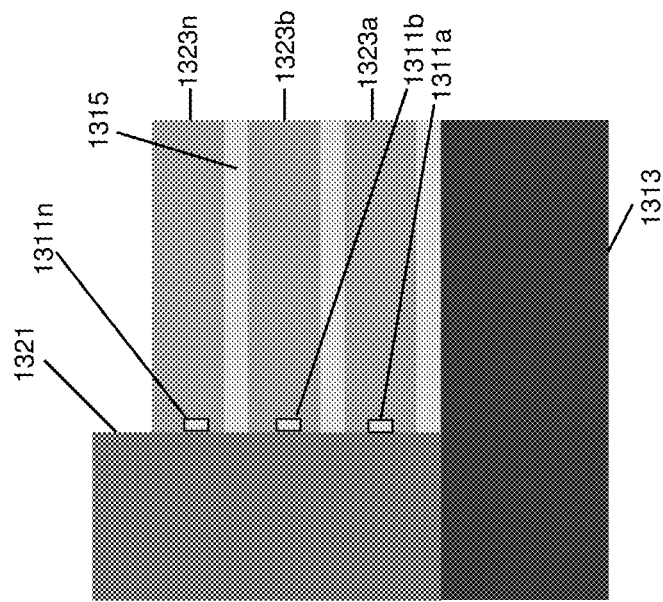
FIGS. 13A and 13B shows examples of arrangements of TR elements in a multi-level TR embodiment, in accordance with aspects of the invention.
Figure 13A:
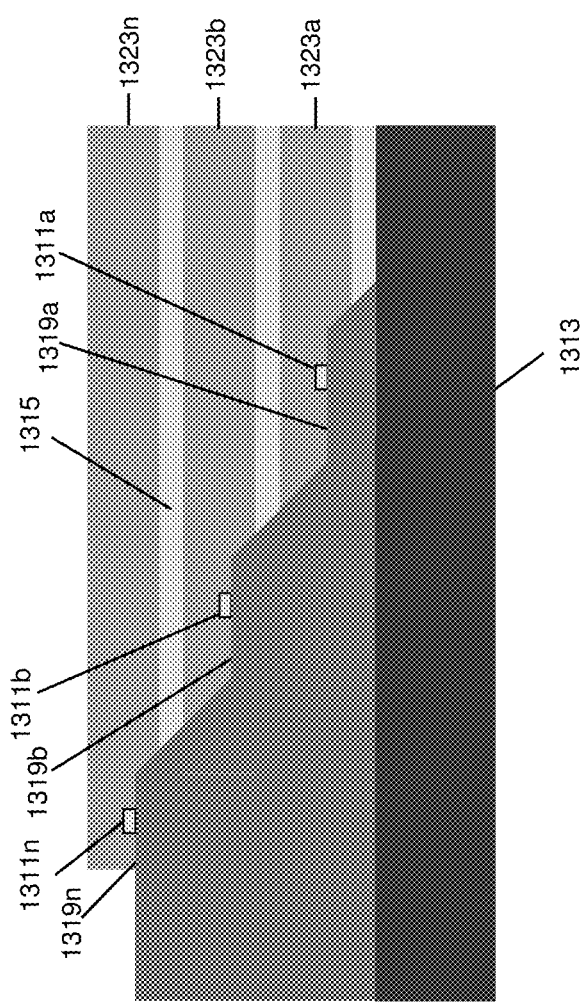

FIG. 13A shows another embodiment with TR elements at different heights. In some embodiments, each row of TR elements 1311a-n is on a corresponding step 1319a-n, with higher numbered rows being on higher steps. The transition between steps may be approximately vertical or may be a more gradual slope. The first row of TR elements 1311a optically couples into a first layer of planar waveguides 1323a, the second row of TR elements 1311b couples into a second layer of planar waveguides 1323b, and the nth row of TR elements 1311n couples into the nth layer of planar waveguides 1323n. In some embodiments, the steps 1319a-n are fabricated from a base substrate 1313, for instance by selectively etching away the substrate to create higher and lower areas. In some embodiments, the steps 1319a-n are fabricated by depositing and patterning material on a base substrate 1313. In some embodiments, the steps are fabricated from polymer, $SiO_2$, or SiN. In some embodiments, the waveguide layers are separated from each other by cladding 1315.

FIG. 13B shows an embodiment in which the TR arrays are mounted normal to the plane of the substrate 1313 on which the waveguides are mounted. Each row of TR elements 1311a-n is mounted on a normal plane 1321, with each row of TR elements optically coupled with a different layer of planar waveguides 1323a-n. The layers of planar waveguides may be separated by cladding 1315. In some embodiments, the normal plane 1321 is fabricated from a base substrate 1313, for instance by selectively etching away the substrate to create the normal plane.

Figure 14:
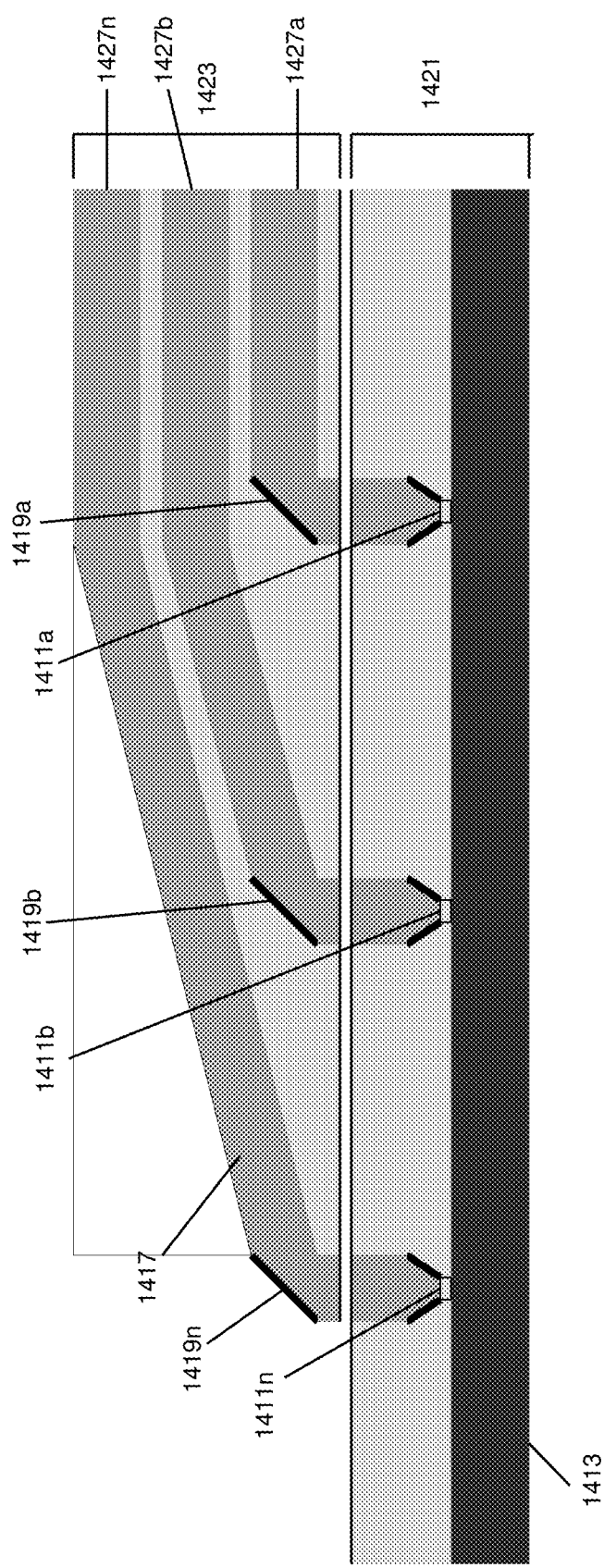
FIG. 14 shows another embodiment of a multi-layer planar waveguide array, in accordance with aspects of the invention.

In some embodiments, an example of which is illustrated in FIG. 14, planar waveguides are part of a modular planar waveguide assembly 1423 that is separate from a planar substrate 1413 on which TR elements 1411a-n are mounted (the "TR assembly" 1421). In some embodiments, the modular TR assembly 1421 may hold vertical sections 1425a, b, of the waveguide layers. The modular planar waveguide assembly 1423 may include turning mirrors 1419a-n that translate light from the vertical sections of the waveguide layers to the planar waveguides 1427a-n of the waveguide layers that generally run parallel to the substrate plane 1413. This modularity can provide numerous advantages during fabrication, assembly, and operation. In some embodiments, the planar waveguide assembly is permanently attached to the TR assembly during a 1-time mating process. In other embodiments, the planar waveguide assembly can be mated and de-mated from the TR assembly numerous times using an appropriate connector mechanism.

Although the invention has been discussed with respect to various embodiments, it should be recognized that the invention comprises the novel and non-obvious claims supported by this disclosure.

What is claimed is:

1. A multi-layer planar interconnect comprising:
    a first optical transceiver array comprising a plurality of first microLEDs, first transmitter circuitry for the plurality of first microLEDs, a plurality of first photodetectors, and first receiver circuitry for the plurality of first photodetectors;
    a second optical transceiver array comprising a plurality of second microLEDs, second transmitter circuitry for the plurality of second microLEDs, a plurality of second photodetectors, and second receiver circuitry for the plurality of second photodetectors;
    a multi-layer planar waveguide array, comprised of multiple layers of waveguides, each layer including a plurality of waveguides, coupling the first optical transceiver array and the second optical transceiver array;
    a first optical layer-shift array coupled between the first optical transceiver array and the multi-layer planar waveguide array, the first optical layer-shift array configured to transfer light between the first optical transceiver array and the multi-planar waveguide array; and
    a second optical layer-shift array coupled between the second optical transceiver array and the multi-layer planar waveguide array, the second optical layer-shift array configured to transfer light between the second optical transceiver array and the multi-planar waveguide array.

2. The multi-layer planar interconnect of claim 1, wherein the multiple layers of waveguides each comprise of vertical and horizontal waveguide layers, and the first and second optical layer-shift arrays are configured to transfer light produced by the first and second optical transceiver arrays from the vertical waveguide layers to their respective horizontal waveguide layers.

3. The multi-layer planar interconnect of claim 2, wherein the first and second optical layer-shift arrays are each configured to transfer light from the vertical waveguide layer to their respective horizontal waveguide layers by at least one reflector.

4. The multi-layer planar interconnect of claim 3, wherein each of the at least one reflectors comprises a plurality of reflectors.

5. The multi-layer planar interconnect of claim 4, wherein at least some of the plurality of reflectors for each of the first and second optical layer-shift arrays are on different horizontal levels.

6. The multi-layer planar interconnect of claim 1, wherein the multiple waveguide layers each comprise a bottom cladding layer and a patterned core layer on the bottom cladding, the patterned core layer providing an array of rib waveguides.

7. The multi-layer planar interconnect of claim 6, wherein the multiple waveguide layers further comprise a fill cladding between the rib waveguides.

* * * * *